United States Patent [19]

Skubich

[11] Patent Number: 4,896,005

[45] Date of Patent: Jan. 23, 1990

[54] METHOD AND APPARATUS FOR THE CONTINUOUS HEATING, PASTEURIZATION OR STERILIZATION OF FOODSTUFFS OR THE LIKE BY MICROWAVE ENERGY

[75] Inventor: Rolf Skubich, Langehagen, Fed. Rep. of Germany

[73] Assignee: Hermann Berstorff Maschinenbau GmbH, Hanover, Fed. Rep. of Germany

[21] Appl. No.: 323,836

[22] Filed: Mar. 15, 1989

[30] Foreign Application Priority Data

Mar. 31, 1988 [DE] Fed. Rep. of Germany ....... 3811063

[51] Int. Cl.$^4$ .............. H05B 6/78; H05B 6/72
[52] U.S. Cl. .................. 219/10.55 A; 219/10.55 F; 219/10.55 M; 99/451; 426/241; 333/256
[58] Field of Search .............. 219/10.55 A, 10.55 F, 219/10.55 E, 10.55 R, 10.55 M; 333/254, 255, 256, 257; 426/241, 243, 234; 422/21, 22; 99/451, DIG. 14

[56] References Cited

U.S. PATENT DOCUMENTS

| | | | |
|---|---|---|---|
| 3,107,284 | 10/1963 | Dixon et al. ................. | 219/10.55 A |
| 3,704,523 | 12/1972 | Guerga et al. ............... | 219/10.55 A |
| 3,745,291 | 7/1973 | Peterson et al. ............. | 219/10.55 R |
| 3,822,412 | 7/1974 | Carlin et al. ................. | 333/256 |
| 3,916,137 | 10/1975 | Jurgensen .................... | 219/10.55 A |
| 4,198,554 | 4/1980 | Wayne .......................... | 219/10.55 A |
| 4,629,849 | 12/1986 | Mizutani et al. ............. | 219/10.55 F |
| 4,808,782 | 2/1989 | Nakagawa et al. ......... | 219/10.55 M |
| 4,839,485 | 6/1989 | Koch et al. .................. | 219/10.55 A |

FOREIGN PATENT DOCUMENTS 3447544 7/1986 Fed. Rep. of Germany.

Primary Examiner—Philip H. Leung
Attorney, Agent, or Firm—Foley & Lardner, Schwartz, Jeffery, Schwaab, Mack, Blumenthal & Evans

[57] ABSTRACT

An appliance for the continuous treatment of foodstuffs or the like by means of microwaves in a treatment chamber, which allows individual adaptation to different product-pack heights and geometrical product forms, while at the same time ensuring the best possible utilization of the microwave energy supplied. The arrangement of an adjusting device outside the treatment chamber for axially adjusting the microwave feed ducts along their longitudinal axes and for rotating of the feed ducts about their longitudinal axes ensure that the product to be treated is subjected to the microwave energy as efficiently as possible, without the treatment process having to be interrupted by stopping it and opening the treatment chamber.

13 Claims, 2 Drawing Sheets

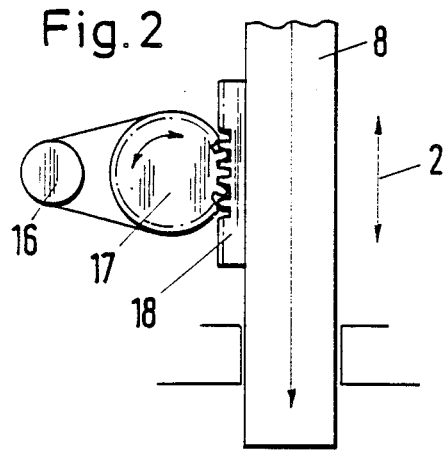
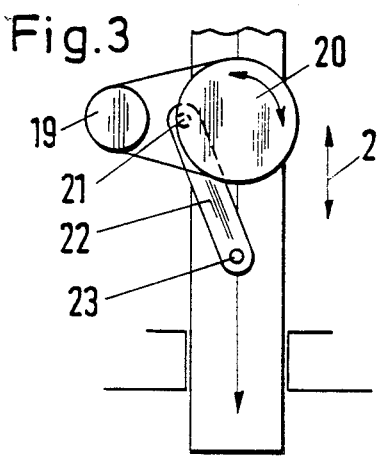
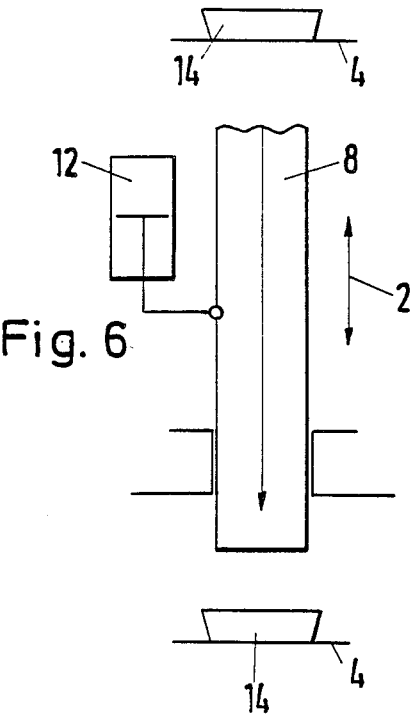
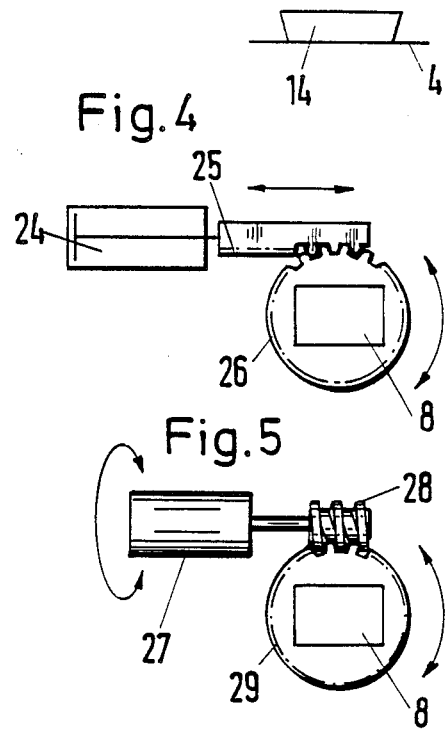

METHOD AND APPARATUS FOR THE CONTINUOUS HEATING, PASTEURIZATION OR STERILIZATION OF FOODSTUFFS OR THE LIKE BY MICROWAVE ENERGY

BACKGROUND OF THE INVENTION

1. Field of the Invention

The invention relates to apparatus for the continuous, uniform and rapid heating, pasteurization and sterilization of foodstuffs or the like carried by a conveyor belt through an elongated microwave treatment chamber.

2. The Prior Art

DE No. 3,447,544 A1 discloses a microwave treatment chamber with microwave feed ducts projecting into the chambers. The advantage of such feed ducts which reach almost to the surface of the product is that the microwave energy can be transmitted directly into the product and converted into heat with less loss, with a specific distance between the exit of the feed ducts and the product having to be maintained.

When larger, for example, taller packs or containers have to be subjected to microwave energy, a special new apparatus adapted to this pack height and to an enlarged pack surface has to be used. In many cases this is very uneconomical because sometimes only relatively small numbers of particular products undergo microwave treatment.

SUMMARY OF THE INVENTION

The object of the invention is to provide apparatus for continuous heating, pasteurization, or sterilization of packaged foods by means of microwave energy, which can be used irrespective of a pack size or of the outer dimensions of a pack or of a product to be treated. In particular, it is possible in accordance with the invention to carry out an exact and very simple setting of a specific distance between the product surface and the end of the microwave feed duct, even for widely varying product or pack sizes, during the continuous operation of the apparatus.

This object is achieved by means of an adjusting device which allows the microwave feed ducts to be adjusted axially in the direction of their longitudinal axes, with the adjusting device being arranged outside the treatment chamber. Because of the variable adjustment of the depth of penetration of the microwave feed ducts or waveguides into the treatment chamber, the apparatus can be adapted to any product height, while at the same time a specific distance between the exit of the ducts and the product surface is maintained.

It is very important that it be possible to carry out the adjustment of the depth of penetration of the microwave feed ducts by means of units arranged outside the treatment chamber and during the operation of the appliance. As a result, the best possible treatment by microwave energy can take place in a very short time and, in addition, involves a very low energy loss, because the microwave energy is conducted in a controlled manner into the product to be treated. As a result, the total quantity of energy required for the treating operation is reduced.

The axial adjustment of the depth of penetration of the feed ducts preferably is effected by means of hydraulic or pneumatic cylinders acting on the ducts outside the treatment chamber. Axial adjustments can also be made by means of a cam mechanism or a rack mechanism.

The invention also provides the ability to additionally rotate the feed ducts about their longitudinal axes by means of a device arranged outside the treatment chamber. This is especially advantageous if feed ducts of rectangular or square cross-section are used. The use of rectangular or square feed ducts is always recommended when products or packs also having a rectangular or square surface are arranged on the moving conveyor belt because the best possible transmission of microwave energy into the product then takes place as a result of a setting of the optimal distance between the exit orifice of the feed duct and the product surface. Energy losses attributable to microwave radiation over and beyond the product edges are thus effectively prevented.

To ensure that a product with a round surface, for example, a packaged plate meal, receives the best possible treatment, a cyclic or constant rotation of a rectangular or square feed duct is especially advantageous, because a round product can then receive the best possible treatment even with a rectangular feed duct. Otherwise, round feed ducts would have to be used.

Exemplary embodiments of the invention are illustrated in the drawing and explained in the specification which follows.

BRIEF DESCRIPTION OF THE DRAWINGS

In the drawings,

FIG. 2 shows diagrammatically a rack mechanism for axial adjustment of a feed duct;

FIG. 3 shows diagrammatically a device for axial adjustment of a feed duct by means of a cam;

FIG. 4 shows diagrammatically an adjusting device for rotating adjustment of the feed duct, FIG. 5 shows a diagrammatic representation of a worm gear for a constant rotation of the feed duct about its longitudinal axis, and FIG. 6 shows an axial adjustment device similar to the device shown in FIG. 1.

DETAILED DESCRIPTION OF THE PREFERRED EMBODIMENTS

Figure 1:
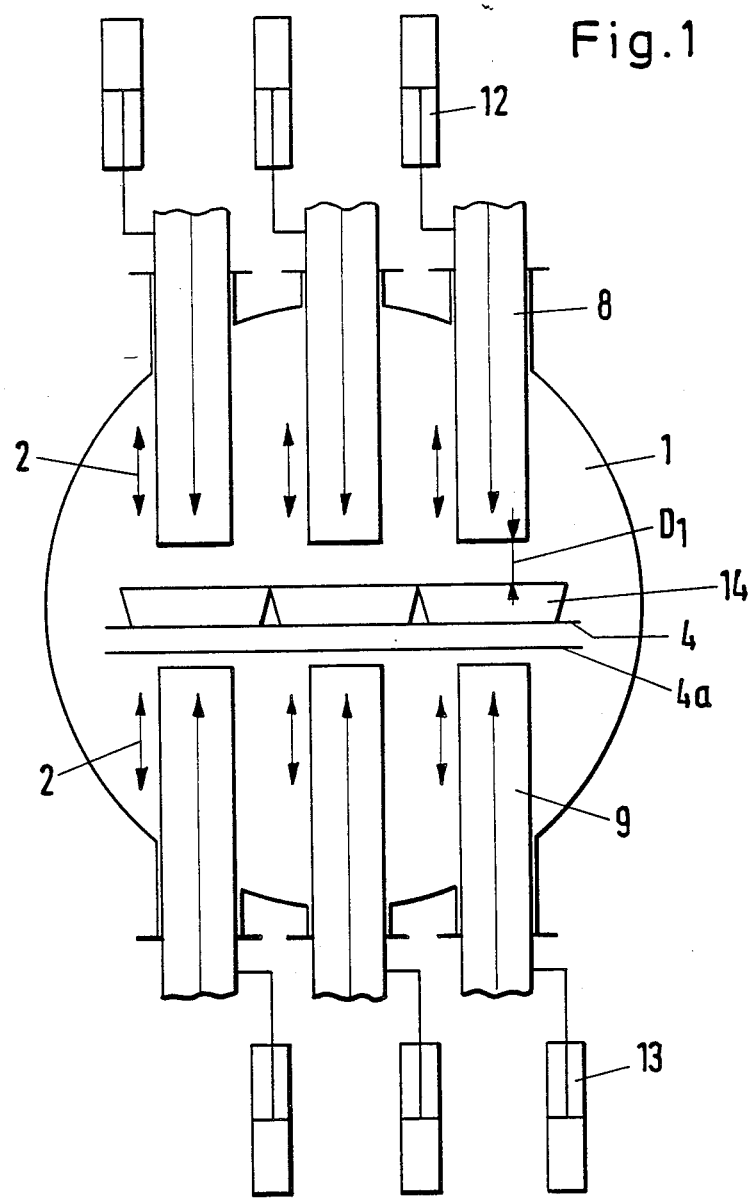
FIG. 1 shows a cross-section through a round treatment chamber with feed ducts.

The cross-section illustrated in FIG. 1 and taken through a round treatment chamber 1 shows three upper wave guides or microwave feed ducts 8 each of which is guided through the wall of the chamber 1 from above, and which point with their exit orifices towards packaged plate meals 14. The plate meals are arranged on an endless conveyor belt 4 designed to be driven in a conventional manner, with the returning, empty side of the conveyor belt designated at 4a.

The microwave feed ducts 9 are guided from below through the wall of the treatment chamber 1 and point towards the bottoms of the packaged plate meals.

The feed ducts 8 and 9, on which individual microwave generators (now shown) are respectively arranged in a well known manner, are adjusted axially in the direction of the marked arrows 2 in the FIG. 1 embodiment by means of pneumatic or hydraulic cylinders 12 and 13, respectively, which are shown diagrammatically and which are arranged outside the chamber.

FIG. 2 shows a rack mechanism with a drive 16 which, by means of a V-belt, drives a toothed disk 17, engaging in turn a rack 18 fastened to the waveguide 8. The microwave feed duct 8 can be set continuously to a specific distance from the foodstuff container 14 as a result of the actuation of the drive 16.

A further possibility for the axial setting of the ducts 8 is shown in FIG. 3. The duct 8 is adjusted axially, via a connecting rod 22, by means of the cam disk 20 rotated by the drive 19. The connecting rod 22 is pinned at 21 to the cam disk and at 23 to the feed duct 8.

FIG. 4 shows a device for rotating the duct 8 about its longitudinal axis. The double-acting cylinder 24 actuates a rack 25 which engages a toothed disk 26 fastened to the duct 8 thus allowing the duct 8 to be rotated. This device can also obtain a cyclic or reversing rotation of the duct 8, which is advantageous when a rectangular feed duct is used for subjecting a round product to microwave treatment. The rectangular exit cross-section of a rotating duct 8 thus also spans the edge regions of the round product, without a round cross-section of a microwave feed duct having to be used. The exit cross-section of the duct should preferably be designed to be geometrically similar to the product surface, and the exit orifice should be located at a specific distance from the product surface. Thus, as a result of the continuous axial adjustment of the ducts 8 and 9 and possibly through additional rotation of the ducts about their longitudinal axis where necessary to treat geometrically dissimilar food packages, it is possible to create conditions which are energy-saving and which at the same time make it possible to obtain a uniform temperature in the product, without the treatment chamber having to be opened.

FIG. 5 illustrates a further setting device for the continuous rotation of the ducts 8, with a worm gear drive 27 and worm gear 28 intermeshing with a worm wheel 29 fastened to the duct 8.

For an axial adjustment of the ducts 8 and 9, where rotation of the ducts 8 and 9 is additionally provided for, either the device for rotation must also be adjusted together with duct 8 axially in the direction of the longitudinal axis of the duct, or vice versa, that is, the setting device for the axial duct adjustment is adjusted axially, together with the duct, and the device for rotating the duct remains at its adjustment location.

FIG. 6 shows the arrangement of FIG. 1 for axially adjusting the waveguide or feed duct 8. The piston of the double-acting hydraulic or pneumatic cylinder 12 is operably secured to the side wall of the duct whereby actuation of the piston in either direction correspondingly moves the duct 8 in an axial direction.

Although FIGS. 2-6 illustrate arrangements for axially moving or rotating only a single feed duct, it will be understood that all of the ducts can be similarly adjusted, or selected groups of ducts, depending upon the characteristics of the food packs being treated.

All of the adjusting devices can be manually actuated but a computer program is preferably utilized, in which the shape and size of the food packs are automatically determined and the required axial and rotating adjustment of individual or groups of feed ducts correspondingly made in response thereto.

What is claimed is:

1. Apparatus for the continuous, uniform and rapid heating, pasteurization and sterilization of packaged foods by microwave energy, comprising:
   (a) an elongated microwave treatment chamber having a longitudinal axis;
   (b) an endless conveyor belt adapted to travel longitudinally through said chamber, with said belt supporting packaged foods of various sizes and shapes to be treated by microwave energy;
   (c) elongated microwave feed ducts with microwave generators extending toward a horizontal plane through the horizontal axis of said chamber, from the exterior of said chamber to the interior thereof both above and below said packaged foods, with the inner ends of said ducts being in selectively variable proximity to said packaged foods; and
   (d) means positioned exteriorly of said chamber for adjusting said ducts toward or away from said packaged foods comprising fluid cylinders arranged outside said treatment chamber and operably secured to said feed ducts for effecting movement thereof in response to actuation of the cylinders;
   whereby packaged foods of various sizes can be continuously optimally treated by microwave energy without access to said treatment chamber and without disruption to the continuous treatment process.

2. Apparatus for the continuous, uniform and rapid heating, pasteurization and sterilization of packaged foods by microwave energy, comprising:
   (a) an elongated microwave treatment chamber having a longitudinal axis;
   (b) an endless conveyor belt adapted to travel longitudinally through said chamber, with said belt supporting packaged foods of various sizes and shapes to be treated by microwave energy;
   (c) elongated microwave feed ducts with microwave generators extending toward a horizontal plane through the horizontal axis of said chamber, from the exterior of said chamber to the interior thereof both above and below said packaged foods, with the inner ends of said ducts being in selectively variable proximity to said packaged foods; and
   (d) means positioned exteriorly of said chamber for adjusting said ducts toward or away from said packaged foods, comprising a rack mechanism positioned exteriorly of said chamber and including a driven rack, and a similarly formed rack member mounted on said adjacent feed duct exteriorly of said chamber, actuation of said rack mechanism effecting movement of said associated feed duct toward or away from said packaged foods;
   whereby packaged foods of various sizes can be continuously optimally treated by microwave energy without access to said treatment chamber and without disruption to the continuous treatment process.

3. Apparatus for the continuous, uniform and rapid heating, pasteurization and sterilization of packaged foods by microwave energy, comprising:
   (a) an elongated microwave treatment chamber having a longitudinal axis;
   (b) an endless conveyor belt adapted to travel longitudinally through said chamber, with said belt supporting packaged foods of various sizes and shapes to be treated by microwave energy;
   (c) microwave feed ducts with microwave generators extending toward a horizontal plane through the horizontal axis of said chamber, from the exterior of said chamber to the interior thereof both above and below said packaged foods, with the inner ends of said ducts being in selectively variable proximity to said packaged foods; and (d) means positioned exteriorly of said chamber for adjusting said ducts toward or away from said packaged foods, comprising a cam assembly including drive means, a cam disk rotated by said drive means, and a connecting arm operatively connected to said cam disk and the associated feed duct, whereby rotation of said cam disk results in movement of said feed duct toward or away form said packaged foods;

whereby packaged foods of various sizes can be continuously optimally treated by microwave energy without access to said treatment chamber and without disruption to the continuous treatment process.

4. Apparatus for the continuous, uniform and rapid heating, pasteurization and sterilization of packaged foods by microwave energy, comprising;
   (a) an elongated microwave treatment chamber having a longitudinal axis;
   (b) an endless conveyor belt adapted to travel longitudinally through said chamber, with said belt supporting packaged foods of various sizes and shapes to be treated by microwave energy;
   (c) elongated microwave feed ducts with microwave generators extending toward a horizontal plane through the horizontal axis of said chamber, from the exterior of said chamber to the interior thereof both above and below said packaged foods, with the inner ends of said ducts being in selectively variable proximity to said packaged foods;
   (d) means positioned exteriorly of said chamber for adjusting said ducts toward or away from said packaged foods; and
   (e) means for rotating one or more of said feed ducts about its longitudinal axis, whereby in addition to positioning each feed duct at the optimal distance from said packaged foods, said feed duct can be rotated to take into account variations in cross-section between said feed duct and the packaged foods;

whereby packaged foods of various sizes can be continuously optimally treated by microwave energy without access to said treatment chamber and without disruption to the continuous treatment process.

5. The apparatus of claim 4, wherein said means for rotating said feed duct about its longitudinal axis comprises an elongated toothed rack, and means for driving the same, and a toothed disk secured to said feed duct, the teeth of said elongated rack and said toothed disk intermeshing to transfer longitudinal movement of said elongated rack into rotative movement of said toothed disk and said feed duct connected thereto.

6. The apparatus of claim 4, wherein said means for rotating said feed duct comprises a worm pinion, and means for rotating the same, and a worm ring arranged around and connected to said feed duct, the teeth of said worm pinion and worm ring intermeshing to effect rotation of said feed duct responsive to rotation of said worm ring.

7. The apparatus of claim 4, wherein said means for rotation said feed duct includes means for cyclical rotation and continuous rotation of said feed duct.

8. The apparatus of claim 4, further including control means for adjusting said ducts toward or away from said packaged goods either individually or in groups, and for cyclically or continuously rotating said feed ducts individually or in groups.

9. The apparatus of claim 8, wherein said control means includes a computer program.

10. The apparatus of claim 4, wherein said means for adjusting said ducts toward or away from said packaged foods comprises a rack mechanism positioned exteriorly of said chamber and including a driven rack, and a similarly formed rack member mounted on said adjacent feed duct exteriorly of said chamber, actuation of said rack mechanism effecting movement of said associated feed duct toward or away from said packaged foods.

11. The apparatus of claim 4, wherein said means for adjusting said ducts toward or away from said packaged foods comprises a cam assembly including drive means, a cam disk rotated by said drive means, and a connecting arm operatively connected to said cam disk and the associated feed duct, whereby rotation of said cam disk results in movement of said feed duct toward or away from said packaged foods.

12. The apparatus of claim 4, wherein said adjusting means comprises fluid cylinders arranged outside said treatment chamber and operably secured to said feed ducts for effecting movement thereof in response to actuation of the cylinders.

13. A method for the continuous, uniform and rapid heating, pasteurization and sterilization of packaged foods by microwave energy, comprising the steps of:
   (a) providing an elongated microwave treatment chamber;
   (b) passing packaged foods on a conveyor belt longitudinally through said chamber;
   (c) inserting elongated microwave feed ducts with microwave generators into the interior of said chamber above and below said packaged foods and in variable proximity thereto, at least portions of said feed ducts being positioned exteriorly of said chamber; and
   (d) adjusting the feed ducts by the portions thereof disposed exteriorly of said chamber, toward or away from the packaged foods whereby packaged foods of various sizes and shapes can be continuously optimally treated by microwave energy without disruption to the continuous operation and without the need for opening said treatment chamber; and
   (e) rotating said feed ducts about their longitudinal axes to accommodate differences in cross-sectional shape between said packaged foods and said feed ducts.

* * * * *